(12) United States Patent
McGough (10) Patent No.: US 6,275,584 B1
(45) Date of Patent: Aug. 14, 2001

(54) TELEPHONE HOUSING WITH LARGE CAPACITY VAULT

(75) Inventor: Gerald B. McGough, Huntsville, AL (US)

(73) Assignee: Quadrum Telecommunications, Inc., Huntsville, AL (US)

( * ) Notice: Subject to any disclaimer, the term of this patent is extended or adjusted under 35 U.S.C. 154(b) by 0 days.

(21) Appl. No.: 09/089,844

(22) Filed: Jun. 3, 1998

Related U.S. Application Data (60) Provisional application No. 60/048,697, filed on Jun. 5, 1997.

(51) Int. Cl.[7] ............................. H04M 1/00; H04M 17/00
(52) U.S. Cl. ............................................. 379/453; 379/145
(58) Field of Search ...................................... 379/445, 451, 379/437, 145, 102, 453; 70/277, 278, 279, 283; 194/350; 453/5

(56) References Cited

U.S. PATENT DOCUMENTS 3,884,515    5/1975    Ashkenazi .
5,802,172  * 9/1998    Ingalsbe et al. ..................... 379/451

FOREIGN PATENT DOCUMENTS 43 42 350 C1    11/1993    (DE) .
0 394 600 A2    11/1989    (EP) .

* cited by examiner

Primary Examiner—Jack Chiang
(74) Attorney, Agent, or Firm—Gardner Groff Mehrman & Josephic P.C.

(57) ABSTRACT

A pay telephone housing comprises a large capacity vault having a floor, first and second side walls, and a back wall. The vault includes a front opening and a peripheral rim extending at least partly around the front opening and having a rear edge. A removable vault door is provided for covering and uncovering the front opening and includes first and second locking plates which are operable to be extended to a locking position at least partly behind the rear edge of the peripheral rim to prevent the removable vault door from being removed from the vault. A key operated lock assembly is operable for selectively locking the first and second locking plates in the locking position.

12 Claims, 10 Drawing Sheets

TELEPHONE HOUSING WITH LARGE CAPACITY VAULT

This application claims the benefit of U.S. Provisional Application(s) No(s).: 60/048,697 Jun. 5, 1997

TECHNICAL FIELD

The present invention relates generally to pay telephones and in particular relates to a pay telephone housing with a vault in a lower portion thereof.

BACKGROUND OF THE INVENTION

In a typical prior art telephone housing, the coin vault (or simply the "vault") is located in the lower part of the housing for storing a coin box which receives money from the coin escrow mechanism of the pay telephone. Existing housings tend to be of a standard size and configuration such that only a certain volume remains for use as the coin vault. Furthermore, known coin vaults typically are strengthened against vandalism and damage by various security measures. For example, it is very typical for vaults to have a front opening in which a removable door is locked. A rim runs around the opening and receives the removable door. Holes are formed in the rim for receiving removable locking bars which can be extended through the holes and locked in place to prevent the removable door from being removed or pried off by a vandal. To further strengthen this arrangement, a second rim or inner rim is positioned within the first (outer) rim such that when the locking bars are locked they extend through openings in the inner rim, then extend through openings in the sides of the removable door, then extend through the openings formed in the outer rim of the vault. This results in a very strong structure, which is very resistant to the removable door being pried off. An example of this arrangement is shown in U.S. Pat. No. 3,884,515. This is also shown in FIG. 1C of the present application.

One major disadvantage to the arrangement just described is that inner rim makes the opening of the vault that much smaller, thereby reducing the maximum volume of a coin box which can be inserted through the opening. Thus, it can be seen that a need yet remains in the art for a telephone housing with a large capacity vault, which at the same time provides good security against vandalism. It is to the provision of such a telephone housing that the present invention is primarily directed.

SUMMARY OF THE INVENTION

Briefly described, in a first preferred form the present invention comprises a pay telephone housing which includes a vault having a floor, a back wall, and first and second side walls. The vault also has a front opening and a single rim is adjacent the front opening and extends therearound. A removable door is provided for covering and uncovering the opening and includes first and second locking members, which are movable between a retracted, unlocked position and an extended, locked position. In the extended, locked position, portions of the first and second locking members traverse a distal end of the rim to prevent the removable door from being removed from the opening. The telephone housing further includes a lock assembly mounted to one of the sidewalls for locking the first and second locking members of the door in the extended, locked position.

Preferably, the rim has a plurality of openings formed therein and the removable door includes a plurality of locking bars which are movable between a retracted, unlocked position and an extended, locked position in which the locking bars extend into the plurality of openings. In this way, two different means are used for securing the removable door in place (the locking members and the locking bars), thereby providing enhanced security against vandalism.

Also preferably, a cam means is provided for operating the first and second locking members simultaneously with the plurality of locking bars. Also preferably, the first and second locking members are substantially plate-like. Also, a flange is preferably mounted to a lower portion of the removable door and is adapted to be slipped over a lower portion of the rim as the removable door is placed in the opening.

The present invention has a very decided advantage over what is known in the prior art. Namely, by eliminating the inner rim which ordinarily is positioned inside the outer rim of the opening, the full size of the opening can be utilized in each direction. In this way, the maximum useful volume of the lower vault is maximized. This is so because by removing the inner rim, a larger size coin box can be fitted through the opening, without the changing the basic size of the opening. The increase in coin box size can be dramatic. For example, in one commercial product, the useful opening size (with the inner rim still provided) is approximately 21 square inches. By removing the inner rim thereof, the useful opening size can be increased to more than 27 square inches, an increase of approximately 30%. By increasing the useful opening size in this way and by also increasing the depth (front-to-back) of the coin box as well, the coin carrying capacity or volume of the coin box can be increased approximately 50%.

While the capacity of the coin vault can be increased for accepting a larger coin box according to the above description of the invention, it nonetheless maintains excellent security inasmuch as a redundant locking mechanism is provided wherein the known locking bars extend through the removable vault door and the rim of the vault. Further, the locking plates engage the back of the rim to keep the removable door from being removed by unauthorized personnel. Thus, there is a form of redundancy in the security measures. The result is a large capacity coin vault, which can accept a large capacity coin box, while maintaining excellent security for the contents of the coin vault.

Accordingly, it is a primary object of the present invention to provide a telephone housing with an enlarged capacity coin vault for accepting a large capacity coin box, while at the same maintaining excellent security for the vault.

It is another object of the present invention to provide a pay telephone housing which is rugged and vandal-resistant, while at the same time providing increased coin collection capacity.

These and other objects, features, and advantages of the present invention will become more apparent to those skilled in the art upon reading the following specification in conjunction with the accompanying drawing figures.

DESCRIPTION OF THE PREFERRED EMBODIMENT

Figure 1A:
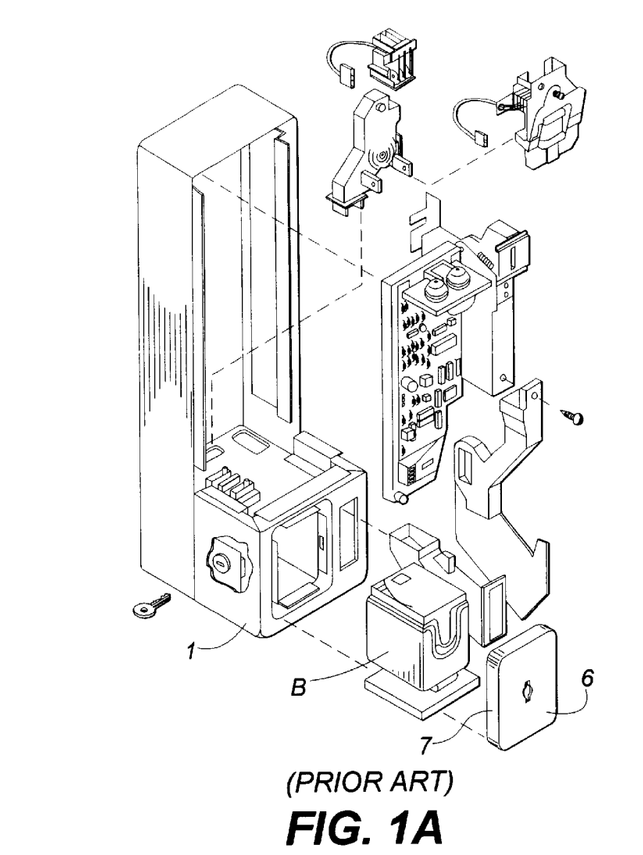
FIG. 1 shows a prior art device, namely a prior art lower pay telephone housing, in exploded view.
Figure 1B:
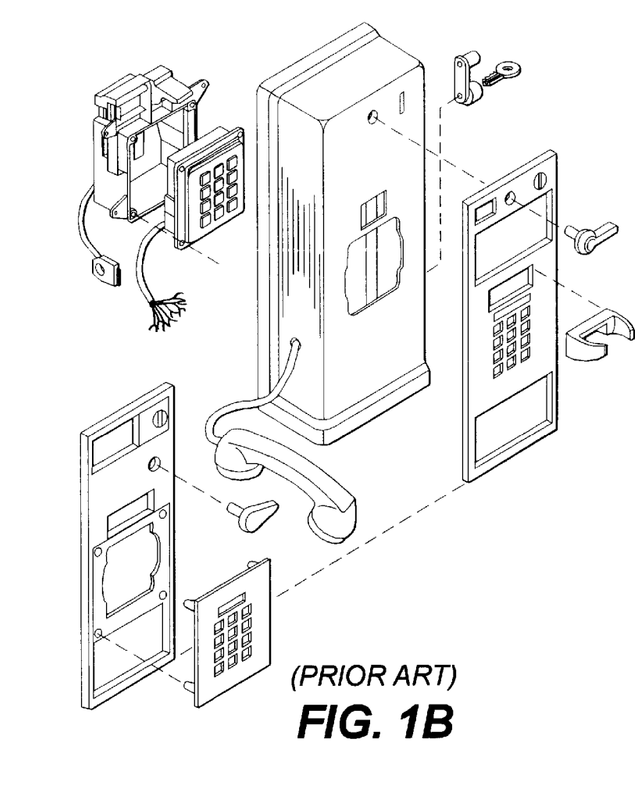
FIG. 1B shows a portion of a prior art pay telephone apparatus, namely an upper housing for cooperating with the lower housing of FIG. 1A.
Figure 1C:
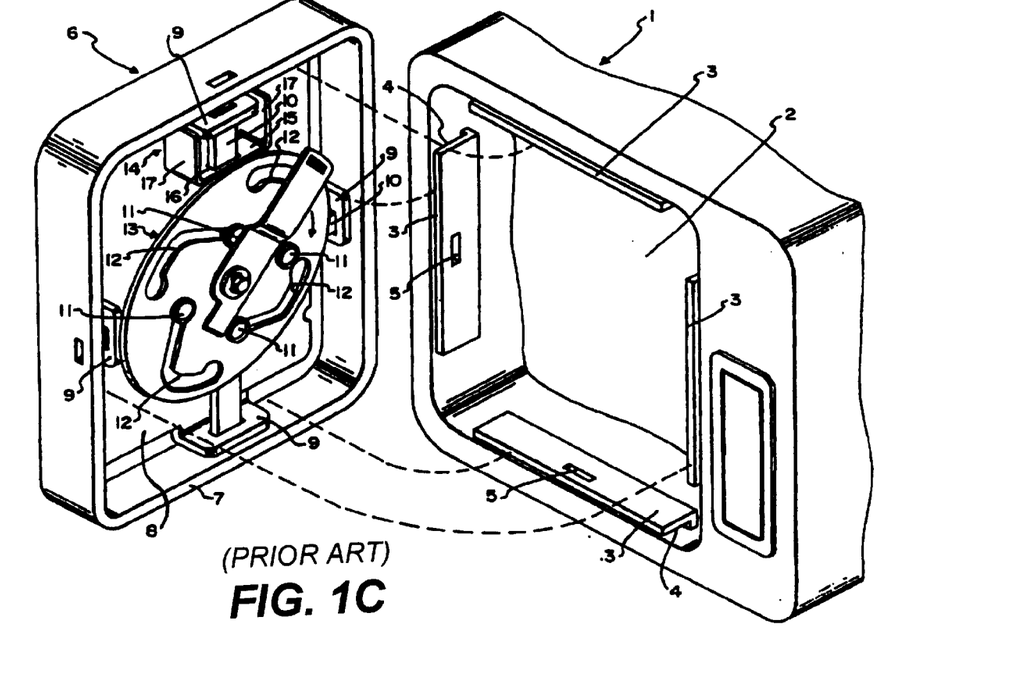
FIG. 1C shows a portion of the prior art housing of FIG. 1A, and in particular shows a portion of a coin vault and a removable coin vault door.

Referring now to FIGS. 1A–1C, there is illustrated a prior art vault housing 1, shown in the partially cut away view of FIG. 1C, illustrating the front portion showing an opening 2 into which, for example, a coin box B may be inserted when the vault is employed in a coin-operated pay telephone. A plurality of tongues 3 extend inwardly from housing 1 toward the center of the opening 2, and then outwardly toward the front of the vault housing. The tongues form an inner rim and in so doing define a groove 4 between the inner rim and the adjacent portion of vault housing 1. The inner rim includes apertures 5 into which locking bars, which will be described subsequently, are inserted to lock the vault door into place.

Shown adjacent to vault housing 1 in FIG. 1A is vault door 6 which is illustrated in the upright or correct position for installation into the opening 2 of the vault housing 1. Vault door 6 includes a front surface and a rim 7 which extends rearwardly from the front surface. When vault door 6 is installed in the vault housing 1, rim 7 extends inwardly and nests in grooves 4. A mounting plate 8 is secured on the inner surface of vault door 6 and includes a plurality of outwardly extending guide arms 9 which support the free ends of locking bars 10. Each locking bar 10 includes along the inner end thereof a stud 11 which rides in a cam slot 12 of a rotary cam 13. An opening is included in the front of vault door 6 into which a special tool may be inserted for rotating cam 13 to move locking bars 10 inwardly and outwardly. As viewed in FIG. 1C, cam 13 has been rotated fully counter-clock-wise and thus has moved locking bars 10 fully inwardly. With cam 13 in this position, vault door 6 may be installed into opening 2 and in so doing the inner rim of the vault will slide between the inner surface of rim 7 and the outermost surface of guide arms 9. With the vault door 6 fully in place, cam 13 can be then rotated in the clockwise direction (as viewed in FIG. 1C) to cause locking bars 10 to move outwardly and extend through apertures 5 in their corresponding tongues 3, and thereby locking vault door 6 in place in the housing 1.

Figure 2:
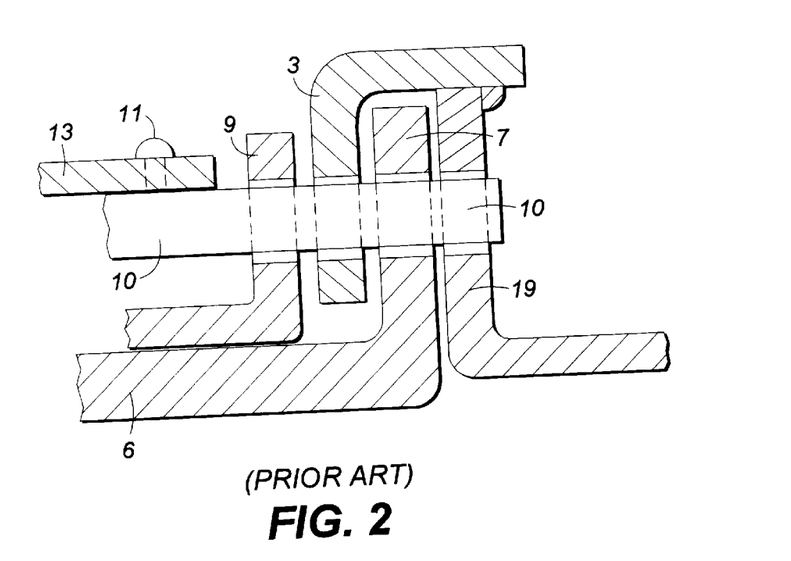
FIG. 2 shows in schematic form the operation of the prior art removable coin vault door of FIG. 1C.

Referring now to FIG. 2, the operation of the vault door 6 can be better understood. As seen in the figure, the guide 9 and the rim 7 of the vault door 6 mesh with the tongue or inner rim 3 and the outer rim 19 of the vault. With the vault door placed in the opening, openings in the guide, inner rim, vault door rim, and outer rim of the vault housing are co-aligned to receive the sliding locking bar 10 therethrough. With the sliding locking bar 10 extended into its locked position as shown in FIG. 2, a very secure structure is achieved.

Referring now to FIGS. 3A–3D, there is shown a vault portion of a housing according to a preferred form of the invention. The vault 30 depicted in FIG. 3A and FIG. 3B includes first and second sides 31 and 32 and a bottom 33 extending therebetween. The vault 30 also includes a back and top panels, not shown in this view. A significant feature of the vault 30 is that a majority of the inner rim typically found in prior art vaults has been removed. Indeed, for example, three of the four tongues 3 shown in FIG. 1C depicting the prior art device have been removed in the design according to the present invention. This greatly increases the useful volume of the vault, as described above.

Figure 3A:
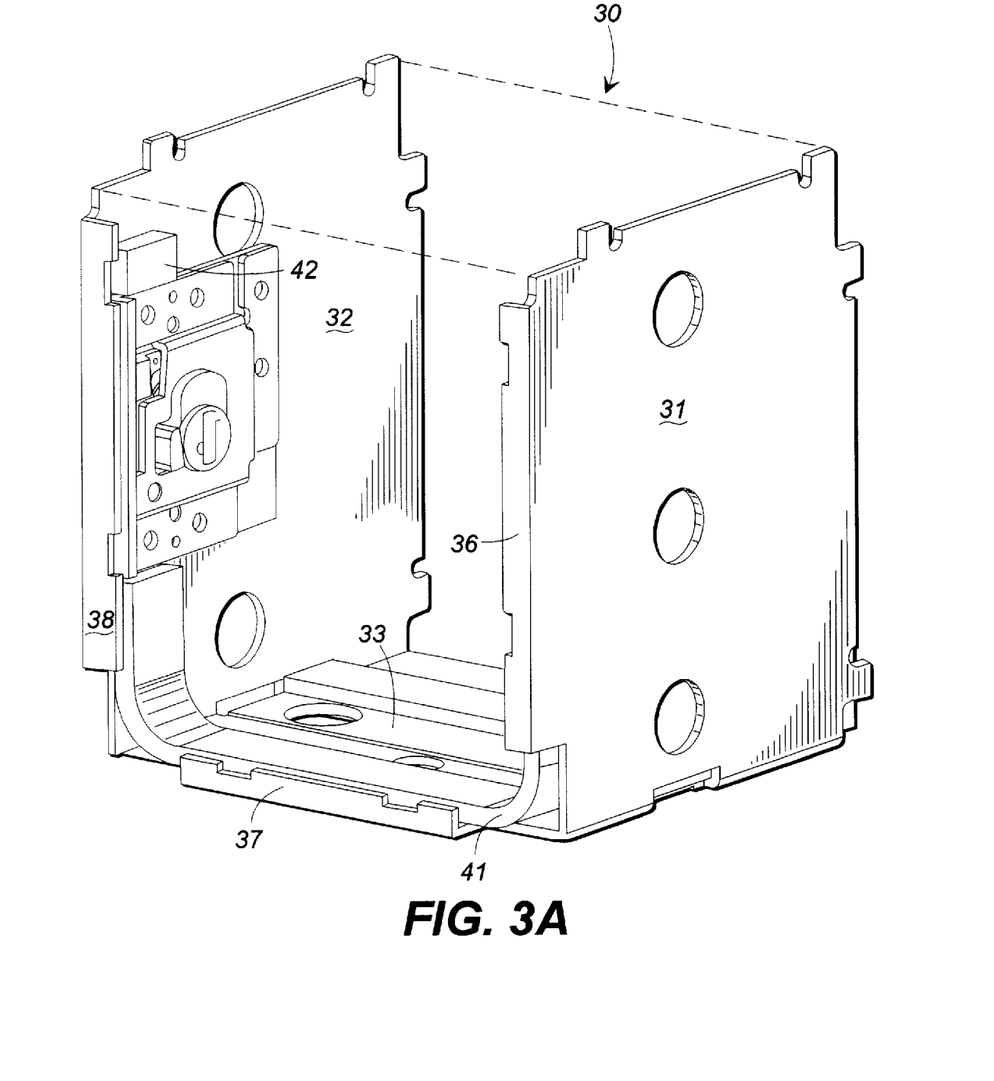
FIG. 3A shows a large capacity coin vault according to a preferred form of the invention, shown in perspective with some elements removed for clarity.
Figure 3B:
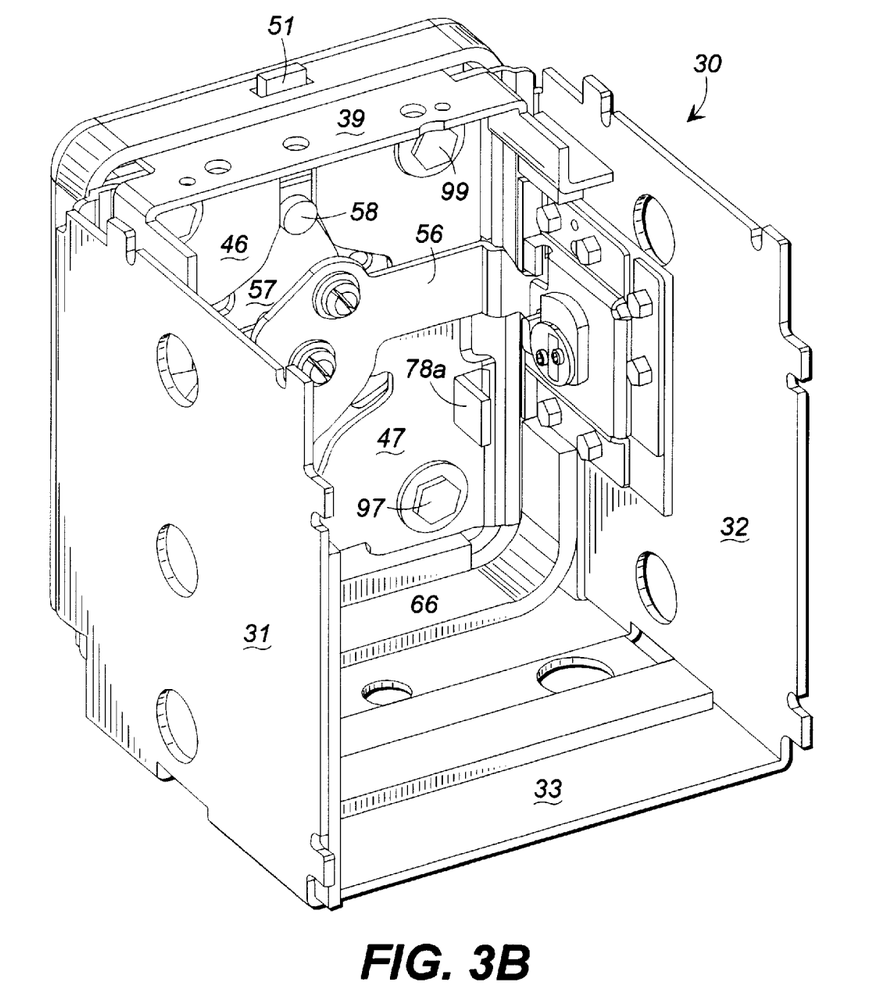
FIG. 3B is a rear perspective view of the coin vault of FIG. 3A.
Figure 3C:
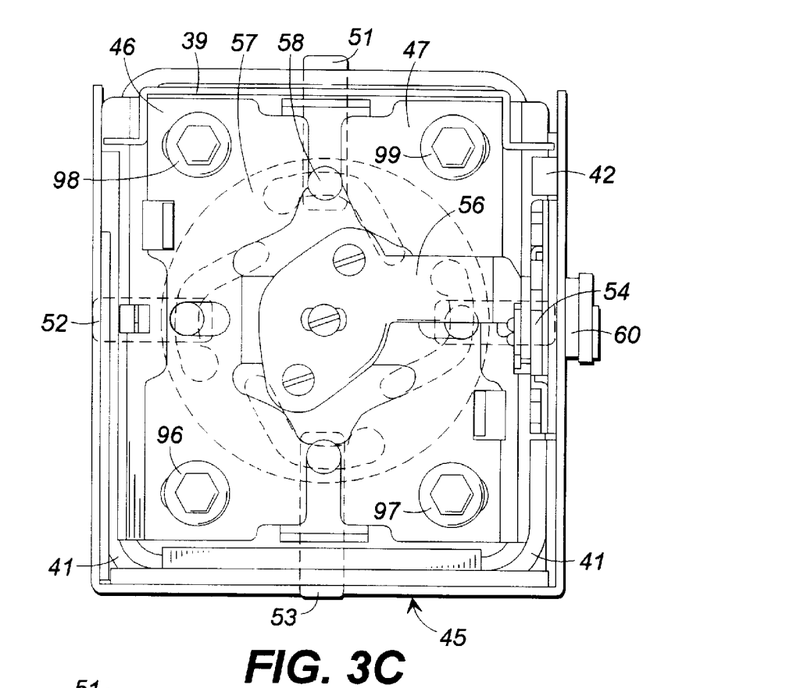
FIG. 3C is a rear elevation view of a removable vault door according to the invention and shown from the inside of the coin vault.

An outer rim is formed by rim members 36, 37 and 38, collectively forming three-fourths of the outer rim. As shown in FIG. 3C, the fourth portion of the outer rim comprises upper vault rim member or flange 39.

A second rim is formed to be co-extensive with the first rim and spaced therebehind (between the first rim and the back of the vault). The second rim includes a generally J-shaped rim member 41 and a short rim member 42. In this way, there is a front rim and a rearward rim and a groove is formed therebetween.

The vault door 45 includes a pair of locking plates 46 and 47, which are extendable between retracted, unlocked positions and extended, locked positions. In the extended, locked position shown in FIG. 3B and FIG. 3C, edge portions of the locking plates 46 and 47 extend laterally outwardly and traverse the rear edges of the rim members 36 and 37 to securely lock the vault door 45 in place. Indeed, the locking plates are received in the groove between the rim members 36 and 37 and the secondary (rear) rim formed by the J-shaped rim member 41 and the short rim member 42. The edges of the extended locking plates engage the rim over a linear distance roughly equal to about half the perimetric length of the rim, providing excellent security against vandalism.

In addition to the novel locking plates 46 and 47, the vault door 45 also has conventional locking bars, such as locking bars 51–54. These locking bars are received through openings formed in the rim of the vault door and also in the smooth-faced rim of the vault. The locking bars 51–54 and the locking plates 46 and 47 are simultaneously operated by a single cam and actuator mechanism, including a cam bar 56 mounted to a circular cam plate 57 which carries studs, such as stud 58. The studs operate in grooves in the cam plate, as is well-known in the art, to move the locking bars in and out. They also move the locking plates in and out.

A low-profile lock cylinder assembly 60 is mounted in the left-hand side of the vault 45 for interaction with the cam bar 56. The lock cylinder assembly 60 operates to lock the cam bar 56 in the position shown in FIG. 3C to prevent the cam bar from being rotated and thereby retracting the locking bars and locking plates. In this way, the lock cylinder assembly 60 cooperates to prevent the vault door 45 from being removed from the opening in the vault. The lock assembly 60 includes a lock mounting plate 61 and a lock bracket 62. The lock assembly 60 also includes a lock cam 63 for engaging a pivotable lock bolt 64. The lock bolt 64 meshes with the cam bar 56 to prevent rotation thereof.

Figure 3D:
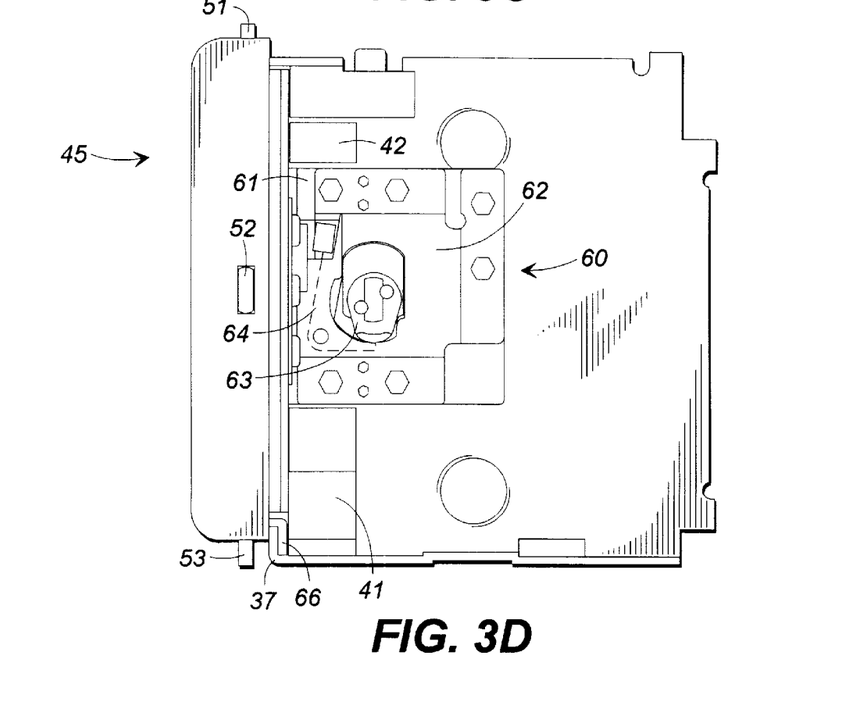
FIG. 3D is a schematic side view of the vault and coin door of FIGS. 3A and 3C.
Figure 4A:
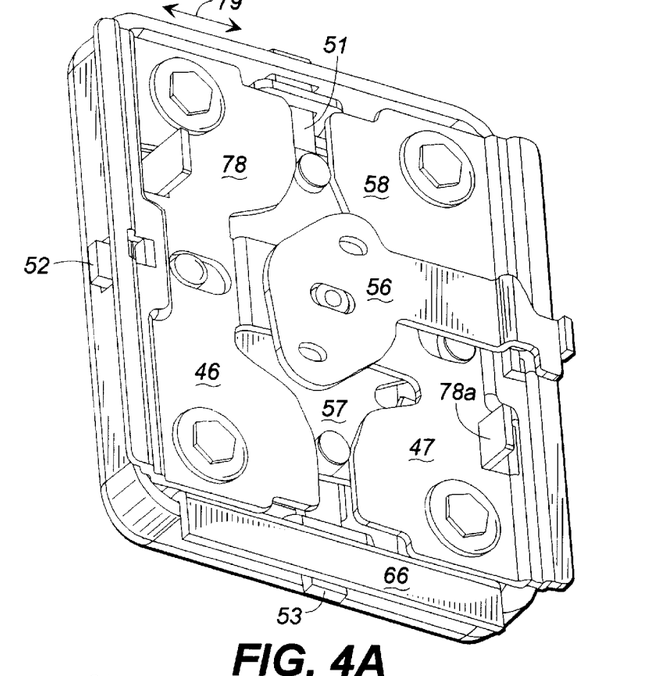
FIG. 4A is a perspective view of the removable vault door of FIG. 3C.
Figure 4B:
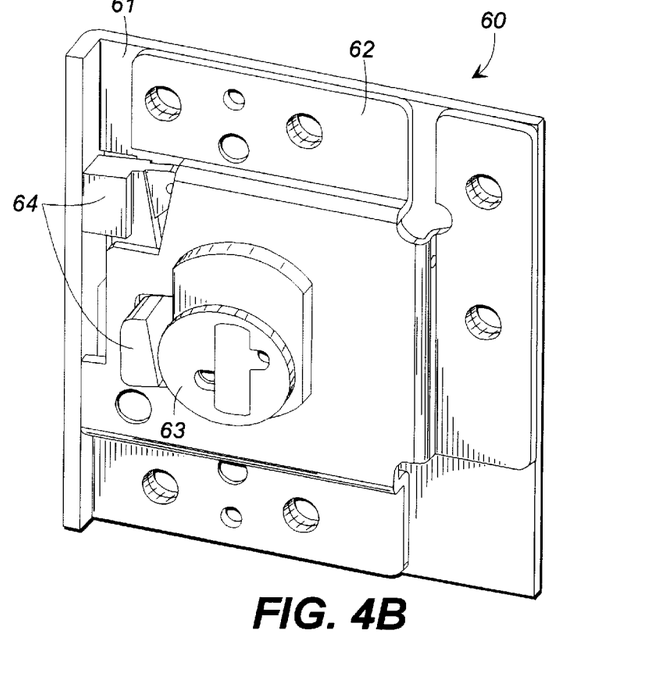
FIG. 4B is a perspective view of a locking mechanism of the vault of FIG. 3A.

As best seen in FIG. 3D, the vault door 45 has mounted thereto a lower vault door flange 66 for slipping over the lower flange or lower rim 37 and into the groove between flange 37 and rim bar 41. FIGS. 4A and 4B show some of the just described details of the apparatus in perspective view, to aid the reader.

Figure 5A:
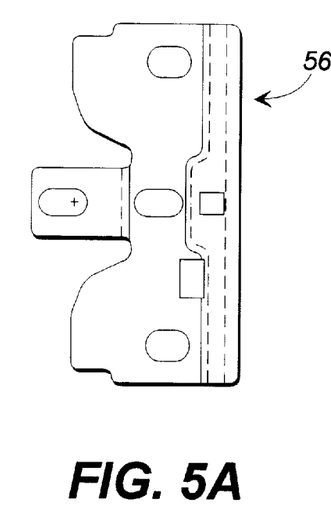
FIGS. 5A and 5B are, respectively, a rear view and a bottom view of a portion of the removable vault door of FIG. 3C.
Figure 5B:
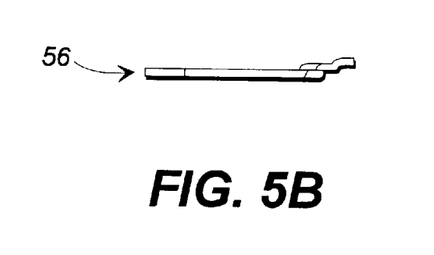
Figures 6A, 6B:
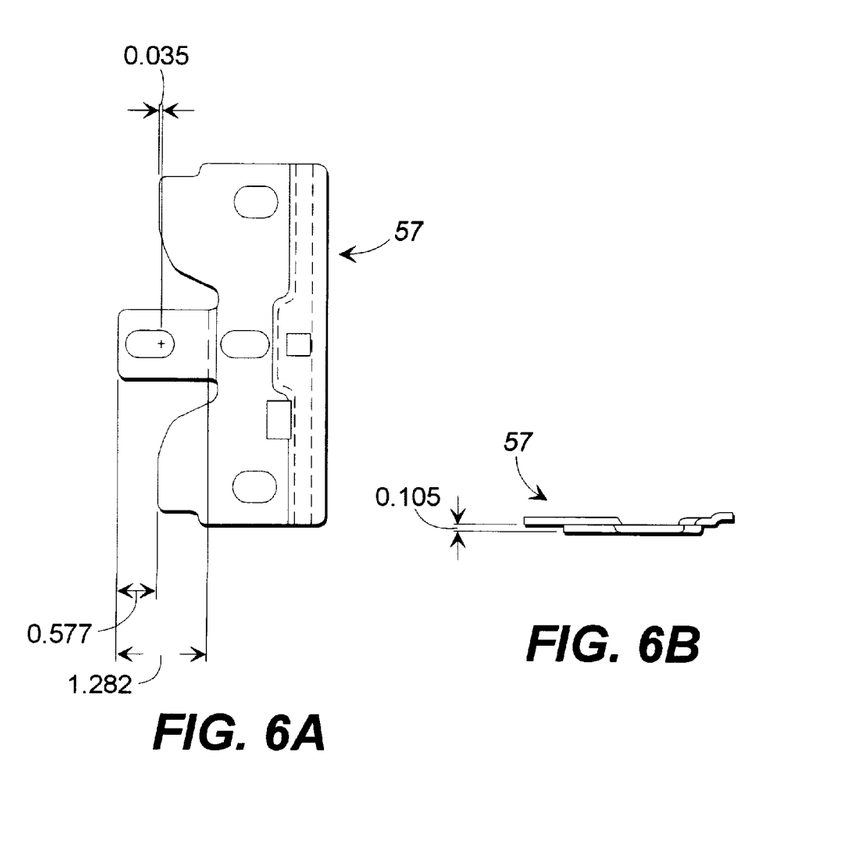
FIGS. 6A and 6B are, respectively, a rear view and a bottom view of another portion of the removable vault door of FIG. 3C.

FIGS. 5A and 6A show side views of the left and right locking plates, while FIGS. 5B and 6B show bottom views thereof. As can be seen, each of the locking plates includes a substantially straight edge on one side and on the other side cam surfaces are formed for engaging the studs to cause the locking plates to move back and forth in the desired manner.

Figure 7:
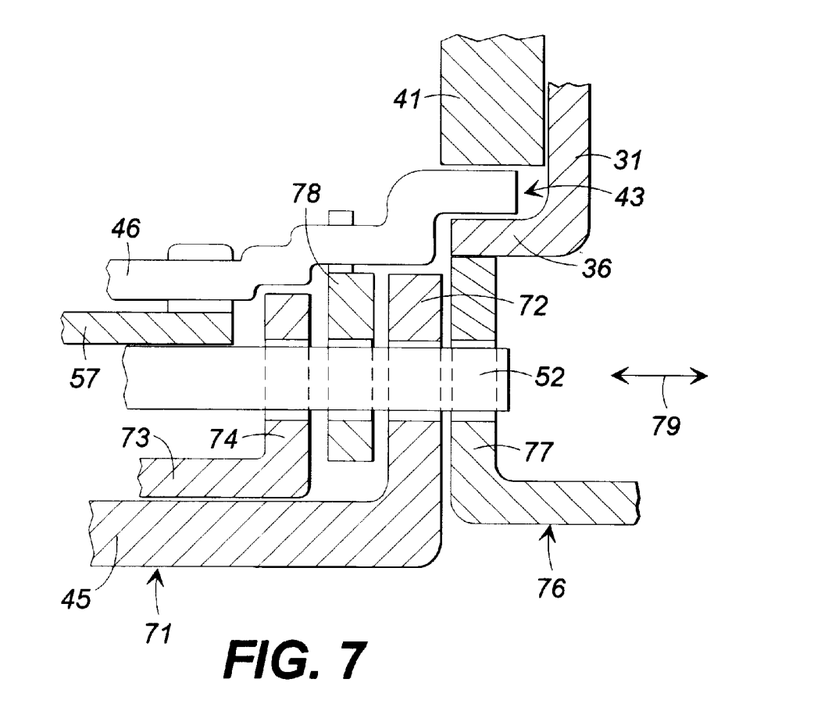
FIG. 7 is a schematic, sectional view of a portion of the vault and removable vault door of FIGS. 3A–3D depicting how the removable door is locked in place in the vault.

Referring now to FIG. 7, interaction of various of the structural elements just described will be more readily appreciated. As shown in FIG. 7, the vault door 45 has a front surface 71 and a peripheral rim 72. The vault door 45 includes a mounting plate 73 with a guide 74 for receiving a locking bar, such as locking bar 52. The vault door 45 is positioned in an opening defined by a front face 76 of the telephone housing and a rim or flange 77 that extends peripherally around the opening and extends from the front face 76 toward the rear of the vault. An additional guide 78 is positioned between the guide 74 and the rim 72 of the vault door.

The additional guide 78 is best seen in FIG. 4A. As seen the Figure, guide 78 is in the form of a projection that extends through a slot. The projection and the slot are sized to constrain movement of the locking plate 46 to a translational, back and forth movement in the direction of direction arrow 79. Similarly, a second guide 78a extends through a slot in locking plate 47 for guiding the movement of locking plate 47. These guides or projections and slots operate in conjunction with the camshaft to control the motion of the lock plates. They keep the motions in a tightly controlled straight line. This prevents the lock plates from skewing slightly clockwise or counter-clockwise off path and therefore prevents binding. This provides for a high L/D equivalent.

The vault is further defined by the vault sidewall panel 31 which includes the rim member 36. Spaced behind the rim member 36 is the J-shaped rim member 41 which defines a groove 43 between the rim members 36 and 41. The end of the locking plate 46 is joggled three times to provide stair-step end thereof to reach the slot 43 and still clear the other structural elements as shown. See also FIGS. 5A–6B for further views of this joggled end of the locking plates.

Figure 8:
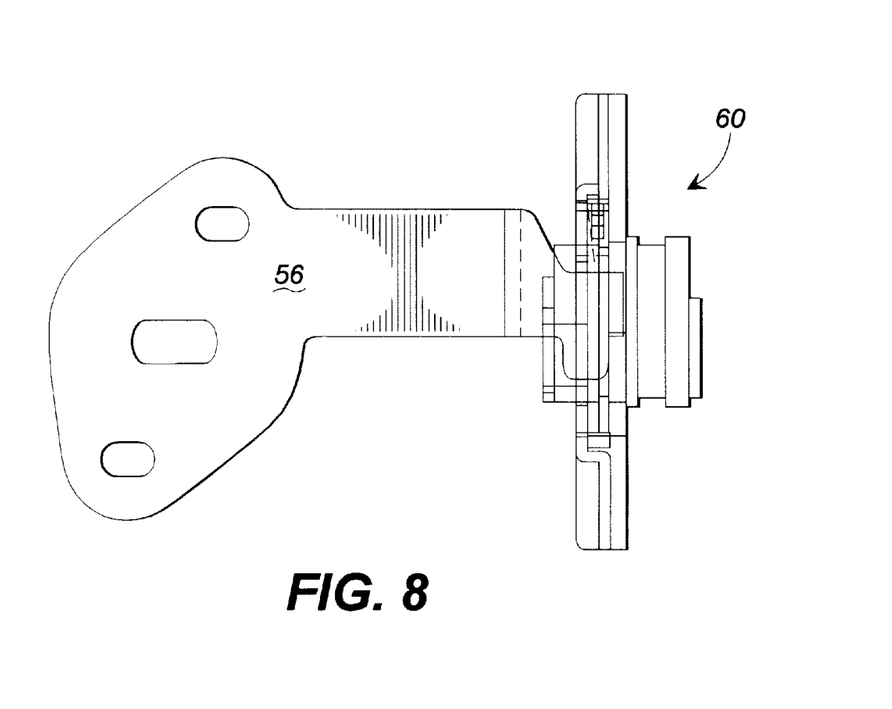
FIG. 8 is a schematic, rear view of a portion of the vault of FIGS. 3A–3D showing the interaction of a key lock mechanism with a portion of the removable vault door.

Thus, as the cam plate operates to move the locking bar 52 back and forth in the direction of direction arrow 79, it also simultaneously operates to move the locking plate back and forth as well. Thus, as shown in FIG. 7, both the locking plate and the locking bar are in the extended, locked position and securely hold the vault door in place. Moreover, as shown in FIG. 8, the lock cylinder assembly 60 operates to prevent the cam bar 56 from rotating counterclockwise and unlocking the locking bar and locking plates by retracting same.

The left and right locking plates are cammed sideways when the top and bottom locking bar studs move sideways outwardly. In the commercial embodiment constructed according to the invention, the left and right locking plates are moved 0.200 inches when the top and bottom locking bar studs are moved 0.500 inches. The top and bottom locking bar studs also jam the left and right locking plates in the locked position. In this way, the locking plates resist being pried open should an attempt be made by a vandal. The top and bottom locking bar studs do not provide a return or unlocking motion of the plates. Rather, return motion of the plates is provided by the left and right locking bar studs. They engage slots in the left and right locking plates to provide an in-line (linear) motion of the locking plates to the unlocked position. On the return stroke, an initial 0.300 inches of motion of the locking bar studs is unused and is absorbed by an elongated slot, with only the final 0.200 inches of motion of the locking bar studs being converted into linear motion of the locking plates.

When the locking plates are moved into the vault rim slot, the highest resistance forces are likely to be encountered. This resistance can be due to paint buildup, out of tolerance distortion of mating parts, misalignment of the vault door, etc. Also, the cam plate has its greatest mechanical advantage in the earliest part of its stroke for moving the locking bar. Accordingly, it is advantageous to move the locking plates as early in the rotation of the cam plates as possible. Therefore, the camming action of the locking plates is used rather than a direct, in-line drive.

Figure 9:
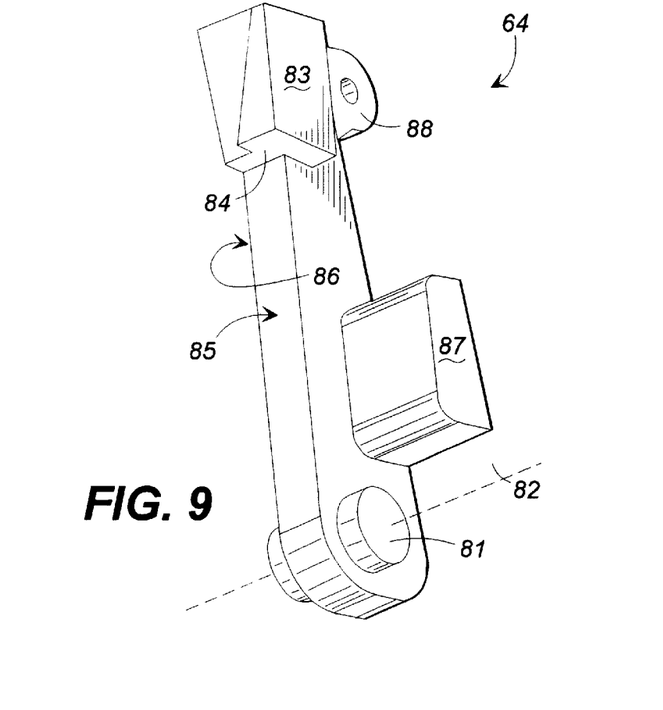
FIG. 9 is a perspective illustration of a portion of the vault of FIGS. 3A and 3B.

Referring now to FIG. 9, the lock bolt 64 of the lock assembly 60 is shown in greater detail. The lock bolt 64 includes a pivot axle 81 for effecting a pivotal motion of the lock bolt 64 about pivot axis 82. The lock bolt 64 also includes a foot or catch 83 for engagement with an end of the cam bar 56 to retain the cam bar in the locked position. In this regard, the catch 83 includes a catch surface 84, which prevents counter-rotation of the cam bar 56. Also, with the bolt 64 lying against cam bar 56, an end of the cam bar engages the far side 86 of the bolt to prevent the two from being separated, as by prying the vault door in one direction and away from the lock cylinder assembly 60. The bolt 64 also includes a paddle 87, which is engaged by the lock cam 63 to cause rotation of the lock bolt 64 about pivot axis 82. An eyelet 88 is used in conjunction with a return spring to bias the bolt in the opposite direction.

Figure 10A:
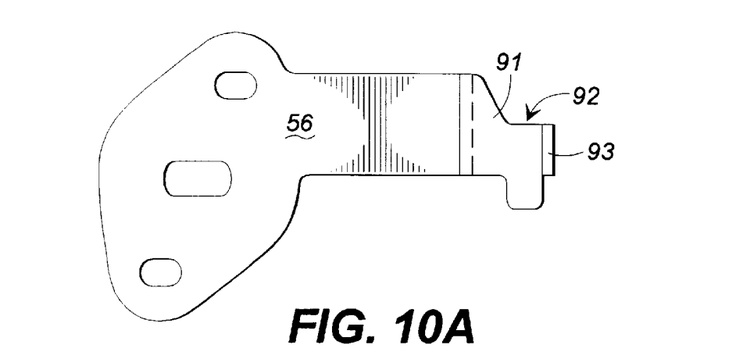
FIGS. 10A–10C are, respectively, rear, bottom, and side views of a portion of the removable vault door of FIGS. 3A and 3B.
Figure 10B:
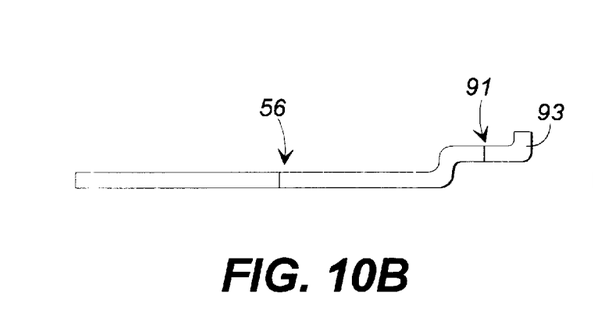
Figure 10C:
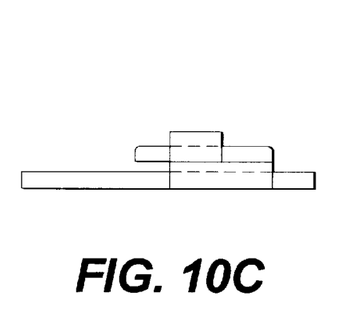

FIGS. 10A–10C show the cam bar in greater detail and isolation. As shown FIGS. 10A and 10B, the cam bar 56 includes a flat 91 near the end of the cam bar. The flat engages surface 85 of the lock bolt. Furthermore, in the locked position, the shoulder 92 engages surface 84 of the lock bolt to prevent counter-rotation. A hook or lip 93 engages the far side surface 86 of the lock bolt and prevents this disengagement thereof.

Figure 11A:
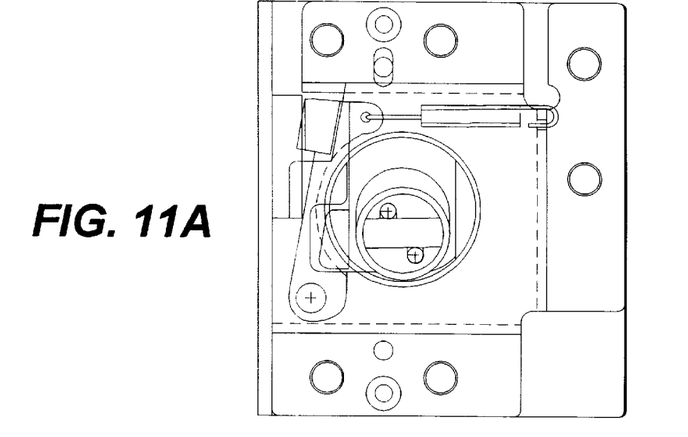
FIGS. 11A–11C are schematic side views depicting the operation of a lock mechanism of the vault of FIGS. 3A and 3D.
Figure 11B:
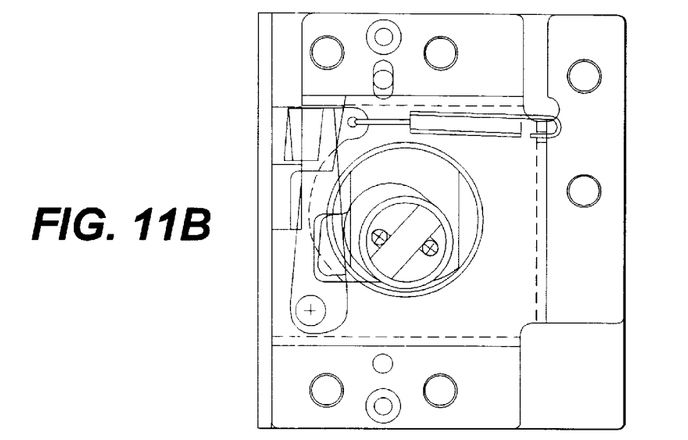
Figure 11C:
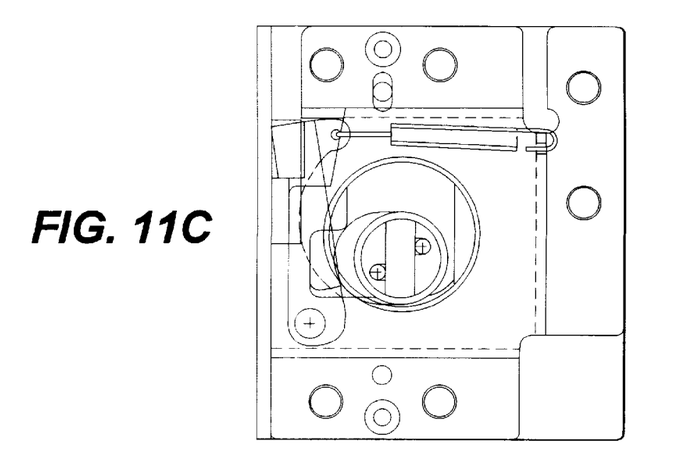

FIGS. 11A–11C show operation of the lock cylinder assembly, and in particular the lock cam, to operate the lock bolt to secure the cam bar in its locked position.

An important aspect of the invention is a proper positioning of the locking plates (front-to-back) by the locking plate screws, such as screws 96–99. (See FIG. 3C). This is important for jam-free operation of the locking plates. The locking plate screws help to keep the locking plates parallel to and positioned against the cam plate. Advantageously, this keeps the locking plates aligned with the rim slot around the vault opening. Additionally, the locking plate screws have a primary function of keeping a vandal from prying the vault door open. The slots through which the locking plate screws are received in the locking plates are significantly oversized so that they do not constrain motion of the locking plates in the X and Y axis.

The present invention advantageously provides a greatly increased coin capacity by increasing the useful volume of the coin vault, thereby allowing a coin box of larger capacity to be placed in the vault. Moreover, it provides equally good security compared with known vault designs. Also, the present invention is compatible with existing self-locking coin box lids. Furthermore, the invention allows the use of existing lock footprints and existing high security lock cylinders. It is also readily adaptable to a lower profile lock design.

The present invention also maintains the outward appearance and size of the telephone housing, thereby avoiding the appearance that a larger amount of money may be inside the vault. In addition, it uses the existing vault door blank. Advantageously, the manufacturing cost of making a housing according to the present invention is only marginally higher than that of making existing designs.

Advantageously, many existing parts from prior art designs are well-suited to use in the present invention. Primarily, the new parts used in the vault door include a different cam bar, a different cam shaft, locking bar studs, the left and right locking plates, the vault door flange (lower), locking plate screws, and locking plate guides.

It is of course to be understood that the embodiment described herein is merely illustrative of the principles of the invention and that a wide variety of modifications thereto may be effected by persons skilled in the art without departing from the spirit and scope of the invention as set forth in the following claims.

I claim:

1. A telephone housing comprising:
   a. a vault having a floor, back wall, first and second sidewalls, and defining a front opening, said vault further including a rim adjacent said opening, said rim having a plurality of openings formed therein and having a rear edge;
   b. a removable door for covering and uncovering said opening, said removable door including a primary lock having a plurality of locking bars which are movable between a retracted, unlocked position and an extended, locked position in which said locking bars extend into said plurality of openings, said primary lock further having first and second opposed locking members which are movable between a retracted, unlocked position and an extended, locked position in which portions of soid locking members extend behind said rear edge of said rim on opposite sides of said opening Lo prevent said removable door from being removed from said opening; and
   c. a secondary lock assembly mounted to one of said sidewalls for locking said first and second locking members of said door in said extended, locked position.

2. A telephone housing as claimed in claim 1 further comprising cam means for simultaneously operating said first and second locking members and said plurality of locking bars.

3. A telephone housing as claimed in claim 1 wherein said first and second locking members are substantially plate-like.

4. A telephone housing as claimed in claim 1 further comprising a flange mounted to a lower portion of said removable door and adapted to be slipped over a lower portion of said rim upon insertion of said removable door in said opening.

5. A telephone housing as claimed in claim 1 wherein said rim comprises a primary rim portion and a secondary rim portioned positioned between said primary rim portion and said back wall and defining a groove between said primary and said secondary rim portions, and wherein portions of said first and second locking members are received in said groove when said locking members are in said extended, locked position.

6. A telephone housing as claimed in claim 5 wherein said primary and said secondary rim portions are substantially coextensive.

7. A telephone housing as claimed in claim 1 wherein with said locking members in said extended, locked position said locking members engage said rim over a linear distance roughly equal to about one-half a perimetric length of said removable door.

8. A telephone housing as claimed in claim 1 wherein said rim consists of a single peripheral rim.

9. A pay telephone housing comprising:
   a. a vault having a floor, first and second sidewalls, and a back wall, said vault defining a front opening, said vault further including a rim extending at least party around said front opening, said rim having a rear edge, wherein said rim has plurality of openings formed therein;
   b. a removable vault door for covering and uncovering said front opening and including a primary lock having firs and second reciprocating locking plates which are operable to be extended to a locking position at least partly behind said rear edge of said rim, wherein said removable door includes a plurality of locking bars which are movable between a retracted, unlocked position and an extended, locked position in which said locking bars extend into said plurality of openings, to prevent said removable vault door from being removed from said vault; and
   c. a secondary lock assembly operable for selectively locking said first and second reciprocating locking plates in said locking position.

10. A pay telephone housing as claimed in claim 9 wherein said rim consists of a single peripheral rim.

11. A pay telephone housing as claimed in claim 10 further comprising a cam for operating said locking plates and said locking bars.

12. A pay telephone housing as claimed in claim 9 wherein said rim comprises a primary rim portion and a secondary rim portion positioned behind said primary rim portion and coextensive therewith to form a groove therebetween for receiving said locking plates.

* * * * *